United States Patent
Jolivet

(10) Patent No.: US 10,225,736 B2
(45) Date of Patent: Mar. 5, 2019

(54) METHOD AND APPARATUS FOR MANAGING AUTHENTICATION IN WIRELESS COMMUNICATION SYSTEM WHILE SUBSCRIBER IDENTITY MODULE IS NOT AVAILABLE

(71) Applicant: LG Electronics Inc., Seoul (KR)

(72) Inventor: Paul Jolivet, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/511,436

(22) PCT Filed: Oct. 6, 2015

(86) PCT No.: PCT/KR2015/010552
§ 371 (c)(1),
(2) Date: Mar. 15, 2017

(87) PCT Pub. No.: WO2016/056820
PCT Pub. Date: Apr. 14, 2016

(65) Prior Publication Data
US 2017/0295490 A1  Oct. 12, 2017

Related U.S. Application Data

(60) Provisional application No. 62/060,016, filed on Oct. 6, 2014.

(51) Int. Cl.
*H04L 29/06* (2006.01)
*H04W 12/06* (2009.01)
*H04W 8/18* (2009.01)
*H04W 12/04* (2009.01)

(52) U.S. Cl.
CPC ......... *H04W 12/06* (2013.01); *H04L 63/0876* (2013.01); *H04W 8/183* (2013.01); *H04W 12/04* (2013.01); *H04L 63/0884* (2013.01)

(58) Field of Classification Search
CPC .... H04W 12/06; H04W 8/183; H04L 63/0876
See application file for complete search history.

(56) References Cited

U.S. PATENT DOCUMENTS 9,635,179 B1 *  4/2017  Mateer ................... H04W 4/12
2005/0108171 A1  5/2005  Bajikar et al.
(Continued)

OTHER PUBLICATIONS

3GPP TS 33.102 V11.6.0, Mar. 2014, Release 11, 76 pages.

*Primary Examiner* — Qun Shen
(74) *Attorney, Agent, or Firm* — Dentons US LLP

(57) ABSTRACT

A method and apparatus for performing an authentication procedure in a wireless communication system is provided. A mobile equipment, which runs a plurality of applications, detects that a universal integrated circuit card (UICC) of the mobile equipment is in a first status, in which the UICC is able to answer a request, or a second status, in which the UICC is not able to answer a request. If detected, the mobile equipment stores a first set of authentication credentials in the UICC and a second set of authentication credentials in the mobile equipment, and performs the authentication procedure by using one of the first set of authentication credentials for the first status or the second set of authentication credentials for the second status.

7 Claims, 11 Drawing Sheets

(56) References Cited

U.S. PATENT DOCUMENTS

| | | | |
|---|---|---|---|
| 2008/0278285 A1* | 11/2008 | Matsushima | G06F 21/575 340/5.74 |
| 2010/0048175 A1* | 2/2010 | Osborn | H04L 63/08 455/411 |
| 2010/0082977 A1 | 4/2010 | Boyle et al. | |
| 2011/0078773 A1* | 3/2011 | Bhasin | H04L 63/0838 726/5 |
| 2013/0017862 A1* | 1/2013 | Lee | H04W 60/005 455/558 |
| 2013/0067552 A1 | 3/2013 | Hawkes et al. | |
| 2013/0331063 A1* | 12/2013 | Cormier | H04L 63/0272 455/411 |
| 2014/0011478 A1* | 1/2014 | Collins | H04L 43/00 455/411 |
| 2014/0189359 A1 | 7/2014 | Marien et al. | |
| 2014/0235210 A1* | 8/2014 | Park | H04W 12/04 455/411 |
| 2014/0357222 A1* | 12/2014 | Mohammed | H04M 15/70 455/406 |
| 2017/0171189 A1* | 6/2017 | Byszio | H04L 63/0815 |

\* cited by examiner

METHOD AND APPARATUS FOR MANAGING AUTHENTICATION IN WIRELESS COMMUNICATION SYSTEM WHILE SUBSCRIBER IDENTITY MODULE IS NOT AVAILABLE

CROSS-REFERENCE TO RELATED APPLICATIONS

This application is the National Stage filing under 35 U.S.C. 371 of International Application No. PCT/KR2015/010552, filed on Oct. 6, 2015, which claims the benefit of U.S. Provisional Application Ser. No. 62/060,016 filed on Oct. 6, 2014, the contents of which are all hereby incorporated by reference herein in their entirety.

BACKGROUND OF THE INVENTION

Field of the Invention

The present invention relates to wireless communications, and more particularly, to a method and apparatus for managing authentication in a wireless communication system while a subscriber identity module (SIM) or a Universal SIM (USIM) is not available.

Related Art

Universal Mobile Telecommunications System (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is specified by the $3^{rd}$ generation partnership project (3GPP) that standardized UMTS.

3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

A universal integrated circuit card (UICC) is the smart card used in mobile terminals in GSM and UMTS networks. The UICC ensures the integrity and security of all kinds of personal data, and it typically holds a few hundred kilobytes of memory. With the advent of more services, the storage space will need to be larger.

The UICC (up to R99) was only able to manage one application at a time. In the case of cards used for telecommunication, this application was typically a subscriber identity module (SIM). As a result, the UICC (hardware) was dealing with only one application and always available for this application. However, when SIM application toolkit was introduced (with the possibility of small telecom applications), the "MORE TIME" command was created in order to be able to interrupt those little applications while providing authentication credential to network when required.

Accordingly, the UICC has become a multi-application platform from the R99 of the 3GPP specifications. At this stage, it is able to support multiple applications including SIM or universal SIM (USIM). Aside the telecom applications (SIM, USIM, ISIM . . . ), the UICC may support banking, transportation, other applications, etc. At some time, those additional applications may require the full process capability of the UICC, e.g. in order to process complex security algorithms Such process may last a few seconds, which is over 5-6 seconds delay provided by mobile networks to reply an authentication request.

Accordingly, a method for providing the possibility to authenticate a mobile station in a network may be required, even though the UICC interface is blocked by a long operation.

SUMMARY OF THE INVENTION

The present invention provides a method and apparatus for managing authentication while a subscriber identity module (SIM) or a universal SIM (USIM) is not available in a wireless communication system. The present invention provides mobile network continuity of service where a universal integrated circuit card (UICC) is blocked by a non-telecom application while multiple applications are running The present invention provides a method and apparatus for performing authentication by using one of credentials stored in a UICC or credentials stored in a mobile equipment, when the UICC is busy.

In an aspect, a method for performing, by a mobile equipment, an authentication procedure in a wireless communication system is provided. The method includes running a plurality of applications, detecting that a universal integrated circuit card (UICC) of the mobile equipment is in a first status, in which the UICC is able to answer a request, or a second status, in which the UICC is not able to answer a request, if it is detected that the UICC of the mobile equipment is in the first status or the second status, storing a first set of authentication credentials in the UICC and a second set of authentication credentials in the mobile equipment, and performing the authentication procedure by using one of the first set of authentication credentials or the second set of authentication credentials. The first set of authentication credentials is used for performing the authentication procedure when the UICC of the mobile equipment is in the first status, and the second set of authentication credentials is used for performing the authentication procedure when the UICC of the mobile equipment is in the second status.

In another aspect, a mobile equipment includes a memory, a transceiver, a universal integrated circuit card (UICC), and a processor coupled to the memory, the transceiver and the UICC, and configured to run a plurality of applications detect that the UICC is in a first status, in which the UICC is able to answer a request, or a second status, in which the UICC is not able to answer a request, if it is detected that the UICC of the mobile equipment is in the first status or the second status, store a first set of authentication credentials in the UICC and a second set of authentication credentials in the memory, and perform the authentication procedure by using one of the first set of authentication credentials or the second set of authentication credentials. The first set of authentication credentials is used for performing the authentication procedure when the UICC of the mobile equipment is in the first status, and the second set of authentication credentials is used for performing the authentication procedure when the UICC of the mobile equipment is in the second status.

Although the UICC (normally in charge of authentication tokens) is busy, authentication can be processed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advanced (LTE-A) is an evolution of the 3GPP LTE.

For clarity, the following description will focus on the LTE-A. However, technical features of the present invention are not limited thereto.

Figure 1:
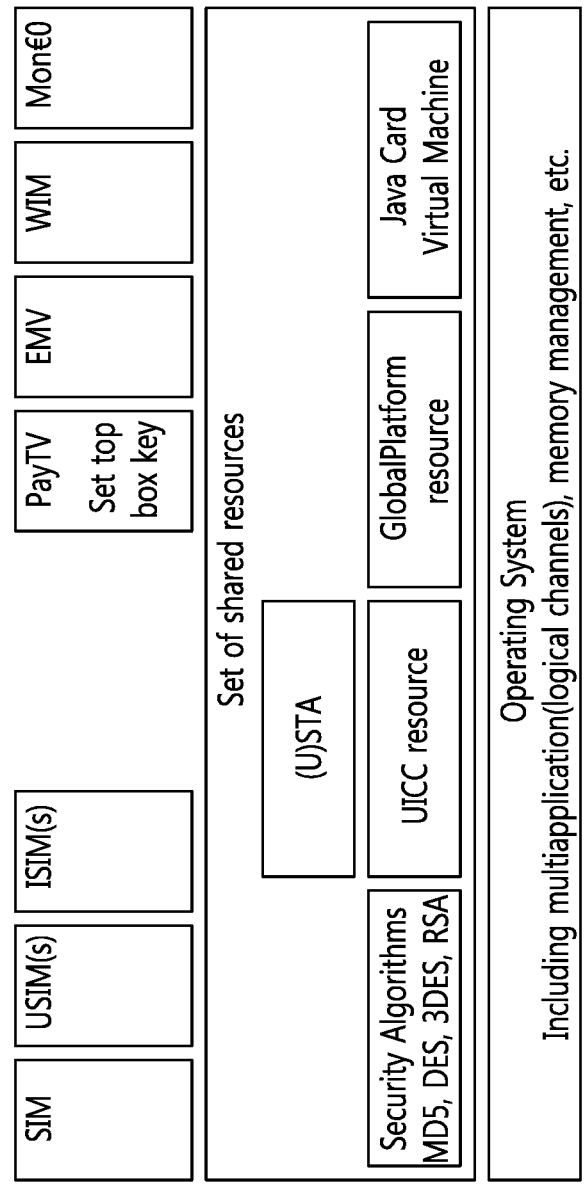
FIG. 1 shows an example of a UICC architecture.

FIG. 1 shows an example of a UICC architecture. A universal integrated circuit card (UICC) is a smart card platform as defined by the European telecommunications standards institute (ETSI) smart card platform (SCP) technical committee. It is designed to provide security and services to any application. Historically, this platform came out of the telecommunication subscriber identification module (SIM) card, however, it may be used simultaneously for multiple other applications, including banking, e-purses, health, transportation, etc. The architecture shown in FIG. 1 shows how applications are based on the common resources of the UICC. The UICC resources are based on international organization for standardization/international electrotechnical commission (ISO/IEC) 7816 series specifications, enhanced by ETSI SCP specific features. Applications are developed on top of this platform by different technical committees, including 3GPP for SIM or universal SIM (USIM), etc., EMVCo for financial applications, governments for health cards, or various services providers for transportation applications, e-purses, etc.

Hereinafter, the UICC refers to a SIM or a USIM. That is, UICC, SIM or USIM may be used mixed with each other in the description below. A mobile equipment (ME) refers to a mobile handset without a UICC. The UICC may not exist in the mobile equipment, or the SIM may not be available since the UICC is busy. A mobile station (MS) refers to a mobile equipment including a UICC.

The UICC is the mandated security token of mobile networks. It supports the storage of authentication credentials (e.g. Ki secret key of GSM, or K secret key of 3G/LTE systems), the capability to run authentication and key generation algorithms (including A3/A8 for GSM, Milenage or TUAK for 3G, RSA, etc.), and data ciphering capability (for instance while downloading application or data on the UICC). Due to interface limitation (half duplex and low rate interface), the UICC does not support voice ciphering for mobile telephony. It only provides authentication credentials to the mobile handset. The ME is in charge of ciphering, supporting the algorithm.

Figure 2:
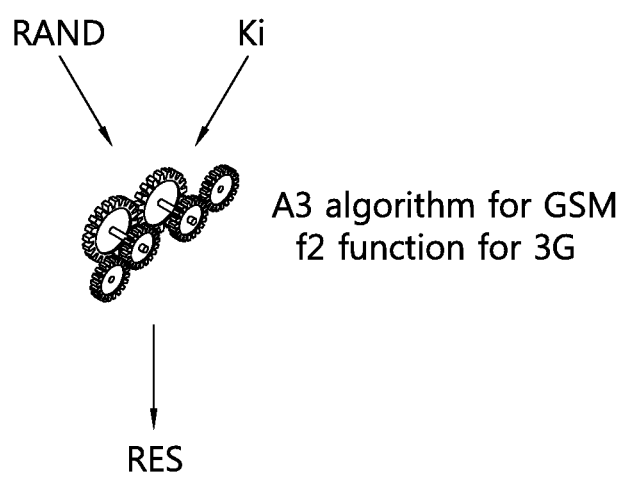
FIG. 2 shows an example of authentication algorithm principle.

FIG. 2 shows an example of authentication algorithm principle. Referring to FIG. 2, the principle of mobile network authentication is based on the use of a secret key and algorithms, one side in the UICC, the other side in a secured part of the home network. The basic principle is that authentication algorithms gets as an input a random number (RAND) provided by the network and a secret key (Ki for GSM, K for 3G), to provide as an output a result (RES, or signed result (SRES), or extend signed result (XRES)). The authentication algorithm may be A3 algorithm for GSM and f2 function for 3G.

Figure 3:
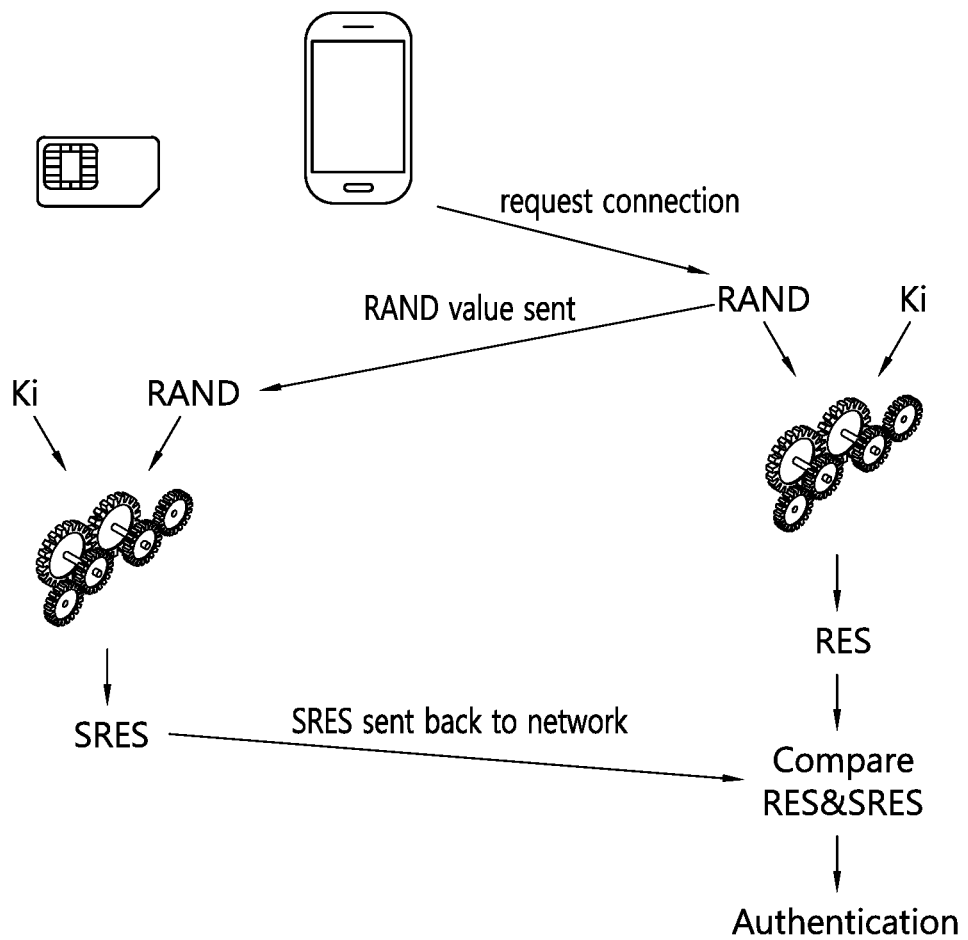
FIG. 3 shows an example of 2G authentication algorithm principle.

FIG. 3 shows an example of 2G authentication algorithm principle. Referring to FIG. 3, the comparison between the -RES value obtained in the UICC and in the network leads to authenticate (or not) the device in the network. 3G authentication is enhanced with additional parameters allowing mutual authentication (i.e. the mobile station is able to detect a fake network). 3G authentication will be further described below in detail.

The authentication request may be generated by the network (this parameter is set by operator who may mandate authentication for any call or message), or the mobile station (in particular while connecting for the first time). Ciphering keys are generated at the time of the authentication process. Additionally, several session keys may be generated in case that the network asks to change key during a session (to avoid process time and delays). In that case, authentication credentials are stored in one side at the mobile equipment and in the other side at the network.

3G security is described. It may be referred to 3GPP TS 33.102 V11.6.0 (2014-03). A security feature is a service capability that meets one or several security requirements. A security mechanism is an element that is used to realize a security feature. All security features and security mechanisms taken together form the security architecture. An example of a security feature is user data confidentiality. A security mechanism that may be used to implement that feature is a stream cipher using a derived cipher key.

Figure 4:
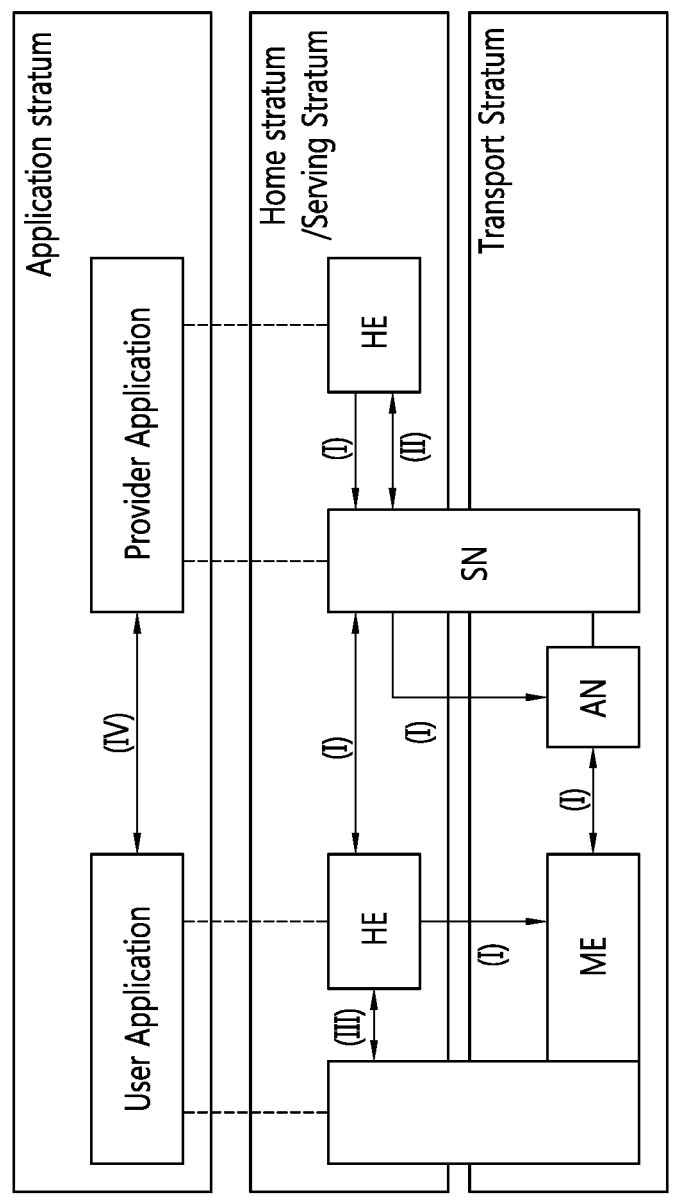
FIG. 4 shows an overview of complete 3G security architecture.

FIG. 4 shows an overview of complete 3G security architecture. Referring to FIG. 4, five security feature groups are defined. Each of these feature groups meets certain threats and accomplishes certain security objectives as follows.

(I) Network access security: the set of security features that provide users with secure access to 3G services, and which in particular protect against attacks on the (radio) access link.

(II) Network domain security: the set of security features that enable nodes in the provider domain to securely exchange signaling data, and protect against attacks on the wireline network.

(III) User domain security: the set of security features that secure access to mobile stations.

(IV) Application domain security: the set of security features that enable applications in the user and in the provider domain to securely exchange messages.

(V) Visibility and configurability of security: the set of features that enables the user to inform himself whether a security feature is in operation or not and whether the use and provision of services should depend on the security feature.

Network access security is described. The network access security may provide user identity confidentiality, entity authentication, confidentiality, data integrity, and mobile equipment identification. Confidentiality is the property that information is not made available or disclosed to unauthorized individuals, entities or processes. Entity authentication is the provision of assurance of the claimed identity of an entity. Data integrity is property that data has not been altered in an unauthorized manner The following security features related to user identity confidentiality are provided:

User identity confidentiality: the property that the permanent user identity (international mobile subscriber identity (IMSI)) of a user to whom a services is delivered cannot be eavesdropped on the radio access link.

User location confidentiality: the property that the presence or the arrival of a user in a certain area cannot be determined by eavesdropping on the radio access link.

User untraceability: the property that an intruder cannot deduce whether different services are delivered to the same user by eavesdropping on the radio access link.

To achieve these objectives, the user is normally identified by a temporary identity by which he is known by the visited serving network. To avoid user traceability, which may lead to the compromise of user identity confidentiality, the user should not be identified for a long period by means of the same temporary identity. To achieve these security features, in addition it is required that any signaling or user data that might reveal the user's identity is ciphered on the radio access link.

The following security features related to entity authentication are provided:

User authentication: the property that the serving network corroborates the user identity of the user.

Network authentication: the property that the user corroborates that he is connected to a serving network that is authorized by the user's home environment (HE) to provide him services. This includes the guarantee that this authorization is recent.

To achieve these objectives, it is assumed that entity authentication should occur at each connection set-up between the user and the network. Two mechanisms have been included: an authentication mechanism using an authentication vector delivered by the user's HE to the serving network, and a local authentication mechanism using the integrity key established between the user and serving network during the previous execution of the authentication and key establishment procedure.

The following security features are provided with respect to confidentiality of data on the network access link:

Cipher algorithm agreement: the property that the MS and the serving network (SN) can securely negotiate the algorithm that they shall use subsequently.

Cipher key agreement: the property that the MS and the SN agree on a cipher key that they may use subsequently.

Confidentiality of user data: the property that user data cannot be overheard on the radio access interface.

Confidentiality of signaling data: the property that signaling data cannot be overheard on the radio access interface.

Cipher key agreement is realized in the course of the execution of the mechanism for authentication and key agreement. Cipher algorithm agreement is realized by means of a mechanism for security mode negotiation between the user and the network. This mechanism also enables the selected ciphering algorithm and the agreed cipher key.

The following security features are provided with respect to integrity of data on the network access link:

Integrity algorithm agreement: the property that the MS and the SN can securely negotiate the integrity algorithm that they shall use subsequently.

Integrity key agreement: the property that the MS and the SN agree on an integrity key that they may use subsequently.

Data integrity and origin authentication of signaling data: the property that the receiving entity (MS or SN) is able to verify that signaling data has not been modified in an unauthorized way since it was sent by the sending entity (SN or MS) and that the data origin of the signaling data received is indeed the one claimed.

Integrity key agreement is realized in the course of the execution of the mechanism for authentication and key agreement. Integrity algorithm agreement is realized by means of a mechanism for security mode negotiation between the user and the network. This mechanism also enables the selected integrity algorithm and the agreed integrity key.

User domain security is described. The user domain security may include user-to-USIM authentication and USIM-terminal link. The user-to-USIM authentication provides the property that access to the USIM is restricted until the USIM has authenticated the user. Thereby, it is ensured that access to the USIM can be restricted to an authorized user or to a number of authorized users. To accomplish this feature, user and USIM must share a secret (e.g. a personal identification number (PIN)) that is stored securely in the USIM. The user gets access to the USIM only if he/she proves knowledge of the secret. USIM-terminal link ensures that access to a terminal or other user equipment can be restricted to an authorized USIM. To this end, the USIM and the terminal must share a secret that is stored securely in the USIM and the terminal. If a USIM fails to prove its knowledge of the secret, it will be denied access to the terminal.

Authentication and key agreement mechanism is described. The authentication and key establishment mechanism achieves the security features listed above and in addition establishes a secret cipher key and integrity key between the user and the serving network. This mechanism should be invoked by the serving network after a first registration of a user in a serving network and after a service request, location update request, attach request, detach request or connection re-establishment request, when the maximum number of local authentications using the derived integrity key have been conducted.

The mechanism described here achieves mutual authentication by the user and the network showing knowledge of a secret key K which is shared between and available only to the USIM and the AuC in the user's HE. In addition, the USIM and the HE keep track of counters $SQN_{MS}$ and $SQN_{HE}$ respectively to support network authentication. The sequence number $SQN_{HE}$ is an individual counter for each user and the sequence number $SQN_{MS}$ denotes the highest sequence number the USIM has accepted.

Figure 5:
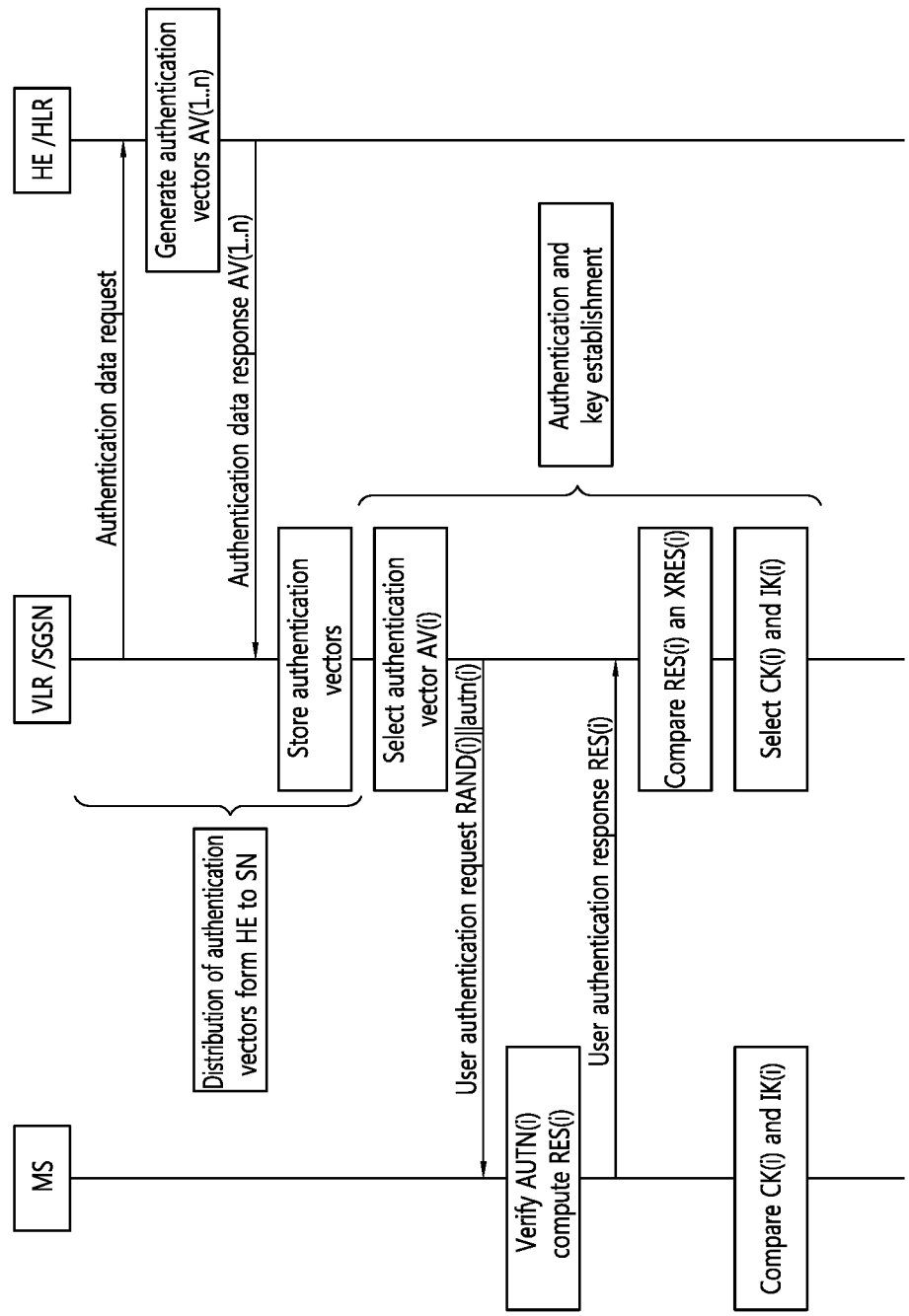
FIG. 5 shows an example of an authentication and key agreement mechanism.

FIG. 5 shows an example of an authentication and key agreement mechanism. Referring to FIG. 5, upon receipt of a request from the visitors location register (VLR)/serving GPRS support node (SGSN), the HE/authentication center (AuC) sends an ordered array of n authentication vectors to the VLR/SGSN. The authentication vectors are ordered based on sequence number. Each authentication vector consists of the following components: a random number RAND, an expected response XRES, a cipher key CK, an integrity key IK and an authentication token AUTN. Each authentication vector is good for one authentication and key agreement between the VLR/SGSN and the USIM.

When the VLR/SGSN initiates an authentication and key agreement, it selects the next authentication vector from the ordered array and sends the parameters RAND and AUTN to the user. Authentication vectors in a particular node are used on a first-in/first-out basis. The USIM checks whether AUTN can be accepted and, if so, produces a response RES which is sent back to the VLR/SGSN. The USIM also computes CK and IK. The VLR/SGSN compares the received RES with XRES. If they match the VLR/SGSN considers the authentication and key agreement exchange to be successfully completed. The established keys CK and IK will then be transferred by the USIM and the VLR/SGSN to the entities which perform ciphering and integrity functions.

VLR/SGSNs can offer secure service even when HE/AuC links are unavailable by allowing them to use previously derived cipher and integrity keys for a user so that a secure connection can still be set up without the need for an authentication and key agreement. Authentication is in that case based on a shared integrity key, by means of data integrity protection of signaling messages.

As described above, the UICC (or, SIM card) is the security token in the mobile station. The UICC became a multi-application platform which is able to manage access to multiple services at the same time. However, in some cases, UICC interface may not be accessible due to running prior application. If the mobile network requires authentication while the UICC interface is busy, the SIM/USIM application may not be able to manage authentication. As a result, the connection to the mobile network may fail. For example, downloading large application on the UICC or handling large cryptographic calculations may block the UICC interface for a few seconds (potentially for a few minutes). Currently, whenever a non-telecom application blocks the UICC for a long time, connection to network may be lost, with as a result possibility to lose calls (incoming), inability to make calls (even emergency calls).

Accordingly, in order to solve the problem described above, a method for providing a mean to authenticate the mobile station on the mobile network, while the SIM/USIM is not able to answer for some reasons, is described according to an embodiment of the present invention. According to an embodiment of the present invention, authentication credentials may be stored in the mobile equipment as well as in the UICC, being identified as fallback authentication credentials. Further, according to another embodiment of the present invention, security mechanisms may be provided so that a fully secured authentication, which is the regular case, may be made as soon as the UICC interface becomes available.

First, a method for storing sets of authentication credentials in both the UICC and the mobile equipment according to an embodiment of the present invention is described. For the UICC being busy, the following two cases may be considered.

Figure 6:
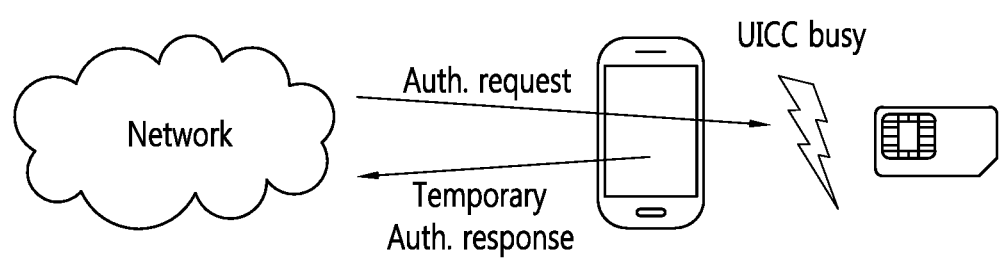
FIG. 6 shows an example of a UICC being busy according to an embodiment of the present invention.

FIG. 6 shows an example of a UICC being busy according to an embodiment of the present invention. In this embodiment, the UICC is in busy processing power. The UICC is busy for processing information for another application, but may be able to answer simple request. In this case, there is a fallback possibility relying completely on the mobile equipment.

Figure 7:
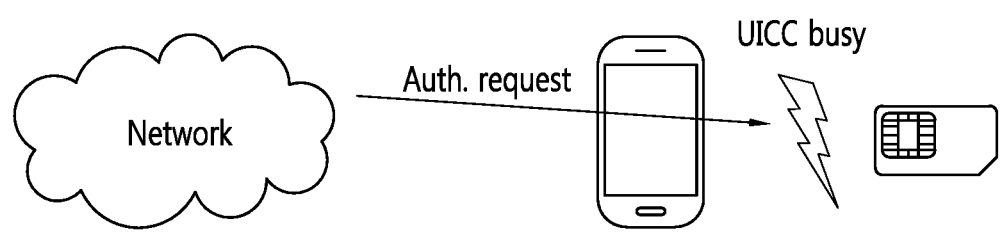
FIG. 7 shows another example of a UICC being busy according to an embodiment of the present invention.

FIG. 7 shows another example of a UICC being busy according to an embodiment of the present invention. In this embodiment, the UICC is in busy interface. The UICC is so busy for processing other applications that the UICC interface itself is not responsive. That is, it is impossible for the UICC to answer to an authentication request, and accordingly, the UICC cannot reply at all.

Considering the two cases described above for the UICC being busy, according to an embodiment of the present invention, sets of authentication credentials may be stored in both the UICC and the mobile equipment. Sets of pre-calculated authentication credentials, instead of making a new calculation, may be used. When the UICC is in busy processing power, corresponding to a case shown in FIG. 6, the authentication credentials stored in the UICC may be used with correct security level. In this case, the network operator may at least rely on the presence of the UICC in the mobile equipment while authenticating. When the UICC interface is busy, corresponding to a case shown in FIG. 7, the authentication credentials stored in the mobile equipment may be used with a low security level.

Figure 8:
FIG. 8 shows an example of locations of sets of authentication credentials according to an embodiment of the present invention.
Figure 8:
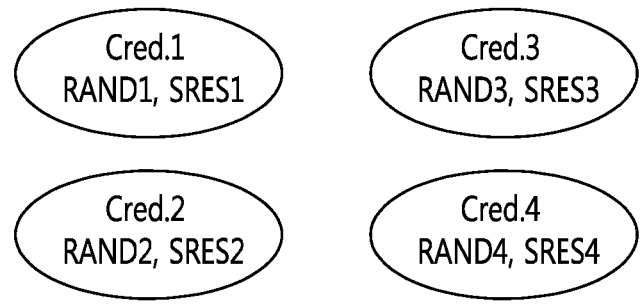

FIG. 8 shows an example of locations of sets of authentication credentials according to an embodiment of the present invention. Referring to FIG. 8, authentication credential sets 1 and authentication credential sets 2 are stored in the UICC. The authentication credential sets 1 and authentication credential sets 2 stored in the UICC may be used when the UICC processing is busy. Further, authentication credential sets 3 and authentication credential sets 4 are stored in the mobile equipment. The authentication credential sets 3 and authentication credential sets 4 stored in the mobile equipment may be used when the UICC interface is busy.

The set of authentication credentials may include at least one of the followings.
- A reference number that provides the possibility to identify the set of authentication credentials in the network later on
- A random number (RAND) provided by the network
- The related (S)RES, which is computed result of the RAND processed within the UICC
- A location security level (LSL) information, which is the information of the location storage (UICC, mobile equipment or secure element)

The reference number may allow identifying the mobile network and the mobile station side which RAND was used, as in the regular authentication mechanism. RAND may not be sent along with the RES to the mobile network. Alternatively, to the use of such reference, RAND may be transmitted to the mobile network for identification set. The LSL information may provide the possibility for the mobile network operator to grant the use of authentication credentials, only if coming from secured storage. Currently, the following levels exist, but some levels may be added in the future.

UICC (highest security)

Secure storage in the Mobile equipment (also known as secure element)

Normal storage in the mobile equipment

In summary, in a normal case, authentication using UICC, which provides the highest security level, may be performed according to the conventional art. However, When the UICC is busy, according to an embodiment of the present invention, the mobile equipment may use a set of authentication credentials that it owns as a temporary fallback authentication credentials. When UICC processing is busy, a set of authentication credentials from the UICC, which provides a medium security level, may be used. When UICC interface is busy, a set of authentication credentials from the mobile equipment, which provides the lowest security level, may be used, based on the secure element (if available), or the normal Storage.

Second, a method for setting a timer or an indicator according to an embodiment of the present invention. As the use of sets of authentication credentials described above is of a lower security level, a mechanism may be used to set a flag to warn the security weakness. That is, in order to ensure a reasonable security level, a regular authentication mechanism shall be made as soon as the UICC gets back to normal state (i.e. available for SIM/USIM application authentication process. According to an embodiment of the present invention, to enforce the security level, either a timer or an indicator (i.e. flag) may be set so that the regular authentication mechanism is made as soon as the UICC interface or process power is back.

According to an embodiment of the present invention, the timer may be set when using sets of authentication credentials stored in both the UICC and the mobile equipment according to an embodiment of the present invention. The timer may be initialized with a fixed value by the mobile network operator. The fixed value may be the part of information stored on the UICC and read by the mobile equipment during the UICC initialization. The timer may set the longest time of use for a no-regular authentication mechanism. The timer may be used at both the mobile equipment and the mobile network.

According to another embodiment of the present invention, the indicator may be set on the mobile equipment to remind processing the regular authentication mechanism as soon as the UICC interface/processor is free to compute. In the standard process, authentication may be made at mobile equipment's request. If the indicator is used, the regular authentication mechanism may be executed, by re-initiating any network side information that the previous authentication was based on an authentication credential. The availability of the UICC interface may be detected using the existing process in the standard.

The sets of authentication credentials may be deleted as soon as being used, in order to prevent any man in the middle attack. That is, the sets of authentication credentials may be used only once.

The mobile network operator may also inform its network in a way that in some cases (or always) only sets of authentication credential sets stored in the UICC or mobile equipment can be used. In this case, in order to provide the possibility, identifier (i.e. LSL) of the sets of authentication credentials may be used. Accordingly, the network may always aware the security level of the storage place of the used sets of authentication credentials. To enforce the use of new sets of authentication credentials, network may transmit a new RAND to the mobile equipment that will be forced to compute authentication credentials.

The present invention may be used whenever a non-3GPP application is used on the UICC and blocking the UICC interface while the mobile network requests an authentication. For example, the user is updating its banking application over the air with lengthy upgrade, and suddenly needs to make an emergency call. The operators always check mobile credentials. In such case, it is more than likely that user may lose connection and not be able to make the emergency call due to network connection loss. In that case, the present invention prevents the loss of network connection due to non-responsiveness of the UICC.

Figure 9:
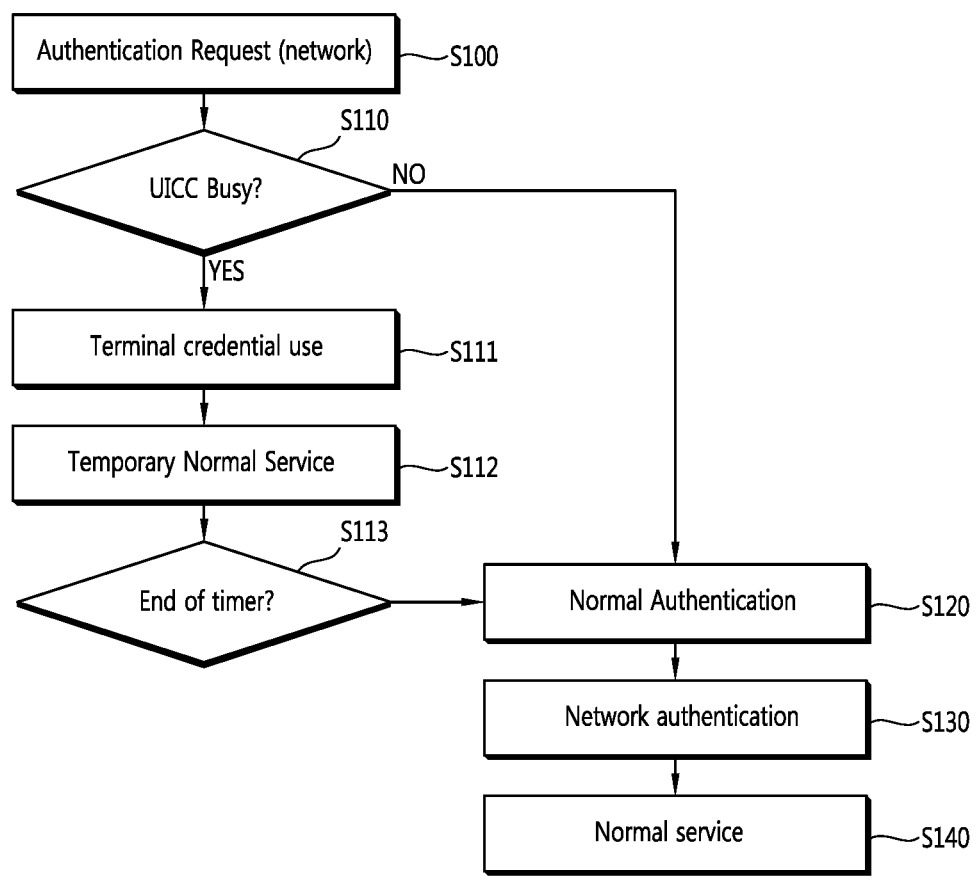
FIG. 9 shows an example of a method for performing an authentication procedure according to an embodiment of the present invention.

FIG. 9 shows an example of a method for performing an authentication procedure according to an embodiment of the present invention.

In step S100, the network request authentication. In step S110, the mobile equipment detects whether the UICC is busy or not. If the UICC is busy, in step S111, the mobile equipment uses the authentication credentials stored in the UICC or the mobile equipment for temporary authentication. In step S112, the temporary normal service is provided based on the temporary authentication. In step S113, the mobile equipment checks whether the timer (or indicator) ends or not. If the timer ends or the UICC is not busy, in step S120, the mobile equipment performs the normal authentication. In step S130, the network performs authentication. In step S140, the normal service is provided based on the normal authentication.

Figure 10:
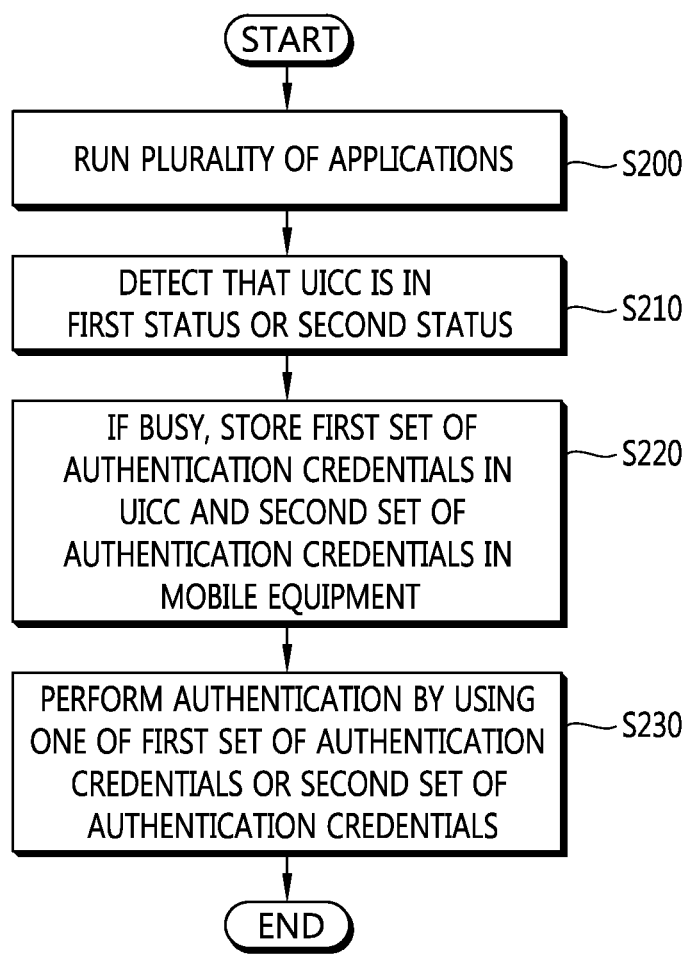
FIG. 10 shows another example of a method for performing an authentication procedure according to an embodiment of the present invention.

FIG. 10 shows another example of a method for performing an authentication procedure according to an embodiment of the present invention.

In step S200, the mobile equipment runs a plurality of applications. In step S210, the mobile equipment detects that the UICC of the mobile equipment is in a first status or a second status. The first status means that the processing of the UICC is busy but the UICC is able to answer a request. The second status means that the interface of the UICC is busy so that the UICC is not able to answer a request.

If it is detected that the UICC of the mobile equipment is in the first status or the second status, in step S220, the mobile equipment stores a first set of authentication credentials in the UICC and a second set of authentication credentials in the mobile equipment. Each of the first and second set of authentication credentials may include at least one of a reference number, a random number, a related result or LSL information. The LSL information may indicate one of the UICC, a secure storage in the mobile equipment, or a normal storage in the mobile equipment.

In step S230, the mobile equipment performs the authentication procedure by using one of the first set of authentication credentials or the second set of authentication credentials. The first set of authentication credentials is used for performing the authentication procedure when the UICC is in the first status. The second set of authentication credentials is used for performing the authentication procedure when the UICC is in the second status.

The mobile equipment may further set a timer upon performing the authentication procedure. The mobile equipment may further perform a normal authentication procedure when the timer expires upon detecting that the UICC is not in the first status or the second status. The timer may be initialized with a fixed value by a mobile network operator. The timer may set a longest time for use of the authentication procedure. Alternatively, the mobile equipment may further set an indicator upon performing the authentication procedure. The mobile equipment may further perform a normal authentication procedure based on the indicator upon detecting that the UICC is not in the first status or the second status.

The mobile equipment may further delete the first and second set of authentication credentials upon performing the authentication procedure.

Figure 11:
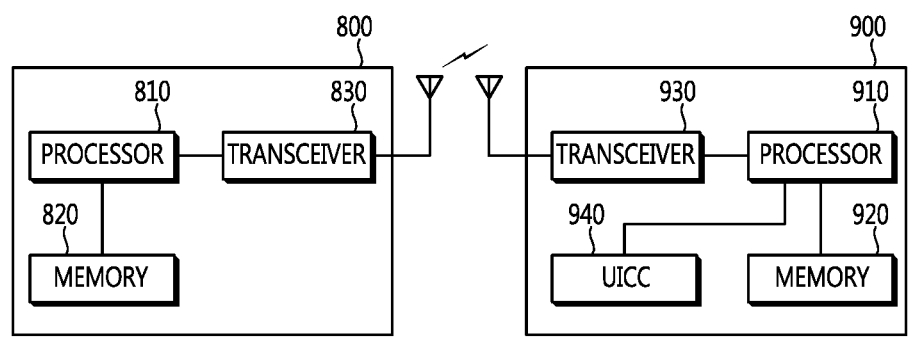
FIG. 11 shows a wireless communication system to implement an embodiment of the present invention.

FIG. 11 shows a wireless communication system to implement an embodiment of the present invention.

An entity of a network 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A mobile equipment 900 may include a processor 910, a memory 920, a transceiver 930, and a UICC 940. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910 and a set of authentication credentials. The transceiver 930 is operatively coupled with the processor 910, and transmits and/or receives a radio signal. The UICC 940 is operatively coupled with the processor 910, and stores a variety of information for authentication and a set of authentication credentials.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a mobile equipment running at least one application, an authentication procedure in a wireless communication system, the method comprising:
  detecting whether a universal integrated circuit card (UICC) of the mobile equipment is in a first status or a second status;
  when it is detected that the UICC is in the first status or the second status, storing a first set of authentication credentials in the UICC and a second set of authentication credentials in the mobile equipment;
  performing a fallback authentication procedure by using one of the first set of authentication credentials or the second set of authentication credentials;
  setting a timer upon performing the fallback authentication procedure; and
  performing a normal authentication procedure when the timer expires and upon detecting that the UICC is not in the first status or the second status,
  wherein when UICC processing is busy but the UICC is able to answer a request, the UICC is in the first status, and when the UICC interface is busy such that the UICC is not able to answer a request, the UICC is in the second status,
  wherein the first set of authentication credentials is used for performing the fallback authentication procedure when the UICC of the mobile equipment is in the first status,
  wherein the second set of authentication credentials is used for performing the fallback authentication procedure when the UICC of the mobile equipment is in the second status,
  wherein the first set of authentication credentials has a higher security level than the second set of authentication credentials, and
  wherein the first set and second set of authentication credentials are pre-calculated.

2. The method of claim 1, wherein each of the first and second set of authentication credentials includes at least one of a reference number, a random number, a related result or location security level (LSL) information.

3. The method of claim 2, wherein the LSL information indicates one of the UICC, secure storage in the mobile equipment, or normal storage in the mobile equipment.

4. The method of claim 1, further comprising:
  deleting the first and second set of authentication credentials upon performing the fallback authentication procedure.

5. A mobile equipment running at least one application comprising:
  a memory;
  a transceiver;
  a universal integrated circuit card (UICC); and
  a processor, operatively coupled to the memory, the transceiver and the UICC, wherein the processor is configured to:
  detect whether the UICC is in a first status or a second status;
  when it is detected that the UICC is in the first status or the second status, store a first set of authentication credentials in the UICC and a second set of authentication credentials in the memory;
  perform a fallback authentication procedure by using one of the first set of authentication credentials or the second set of authentication credentials;
  set a timer upon performing the fallback authentication procedure; and perform a normal authentication procedure when the timer expires and upon detecting that the UICC is not in the first status or the second status, wherein when UICC processing is busy but the UICC is able to answer a request, the UICC is in the first status, and when the UICC interface is busy such that the UICC is not able to answer a request, the UICC is in the second status, wherein the first set of authentication credentials is used for performing the fallback authentication procedure when the UICC of the mobile equipment is in the first status, wherein the second set of authentication credentials is used for performing the fallback authentication procedure when the UICC of the mobile equipment is in the second status, wherein the first set of authentication credentials has a higher security level than the second set of authentication credentials, and wherein the first set and second set of authentication credentials are pre-calculated.

6. The mobile equipment of claim 5, wherein each of the first and second set of authentication credentials includes at least one of a reference number, a random number, a related result or location security level (LSL) information.

7. The mobile equipment of claim 5, wherein the processor is further configured to:

delete the first and second set of authentication credentials upon performing the fallback authentication procedure.

* * * * *